(12) United States Patent
Miclea (10) Patent No.: US 6,761,132 B1
(45) Date of Patent: Jul. 13, 2004

(54) WINDOW AQUARIUM VESSEL (76) Inventor: Jeff Miclea, 906 Pierce Ave., Toronto, OH (US) 43964

( * ) Notice: Subject to any disclaimer, the term of this patent is extended or adjusted under 35 U.S.C. 154(b) by 0 days.

(21) Appl. No.: 10/441,231

(22) Filed: May 20, 2003

(51) Int. Cl.[7] .............................................. A01K 61/00
(52) U.S. Cl. ................................. 119/257; 52/204.593
(58) Field of Search ................................ 119/257, 269, 119/253, 452, 484; 52/202, 203, 209, 204.593, 204.595, 204.597

(56) References Cited

U.S. PATENT DOCUMENTS

| | | | |
|---|---|---|---|
| 2,595,085 A | * 4/1952 | Kuriyama | .................. 362/101 |
| 3,276,428 A | * 10/1966 | Burch | ........................ 119/257 |
| 3,735,738 A | 5/1973 | Lake | |
| 4,143,493 A | * 3/1979 | Booi | ....................... 52/127.12 |
| 4,353,327 A | 10/1982 | Shroyer | |
| 5,090,358 A | 2/1992 | Waldman | |
| 5,435,270 A | 7/1995 | Newman | |
| 5,878,694 A | * 3/1999 | Irwin | ........................ 119/452 |
| 6,439,163 B1 | * 8/2002 | Martin et al. | ................ 119/257 |

* cited by examiner

*Primary Examiner*—Yvonne Abbott
(74) *Attorney, Agent, or Firm*—Harpman & Harpman (57) ABSTRACT

An aquarium to be housed within a vertical wall as a window having a dual support mounting frame with transparent viewing panels held in sealing relation there against. The aquarium provides for scaleable sizing by use of interengaged retention grids securing the transparent viewing panels to the support frame.

17 Claims, 10 Drawing Sheets

WINDOW AQUARIUM VESSEL

BACKGROUND OF THE INVENTION

1. Technical Field

This invention relates to water containment structures used to house aquatic life such as fish. Such tanks are characterized by having large clear viewing surfaces of transparent material and typically have a corresponding user footprint on the floor or tabletop areas. The tanks are heavy due to the weight of the water within and therefore have placement limitations due to their size and bulk.

2. Description of Prior Art

Prior art devices of this type address the limitations of standard aquariums by providing for wall mounting structures that are aesthetically appealing and are practical as to cost and upkeep, see for example U.S. Pat. Nos. 3,735,738, 4,353,327, 5,090,358, and 5,435,270.

In U.S. Pat. No. 3,735,738 a wall mountable aquarium is disclosed having a support frame in which is positioned a tank.

U.S. Pat. No. 4,353,327 discloses an aquarium picture combination in which a three dimensional picture representation is positioned above a tank enclosure.

U.S. Pat. No. 5,090,358 is directed to an aquarium vessel having mounting and holding structures in which a vessel is positioned.

A wall-mounted aquarium with an integral tank is claimed in U.S. Pat. No. 5,435,270 in which a tank having an open top is mounted within a mounting and support frame in a wall surface:

SUMMARY OF THE INVENTION

A window aquarium including a dual support frame and structural grids that form an integral enclosure with transparent front and back walls. The support frame defines a safety retention chamber within about the water enclosure and is in communication with a plurality of grid seals and associated drain lines. Grid connectors extend through the tank and between the support frame to secure the transparent walls to the frame in a sealing relationship. Hanger brackets and cables engage the support frame to suspend the aquarium structure within a wall's window opening.

DESCRIPTION OF THE PREFERRED EMBODIMENT

Figure 1:
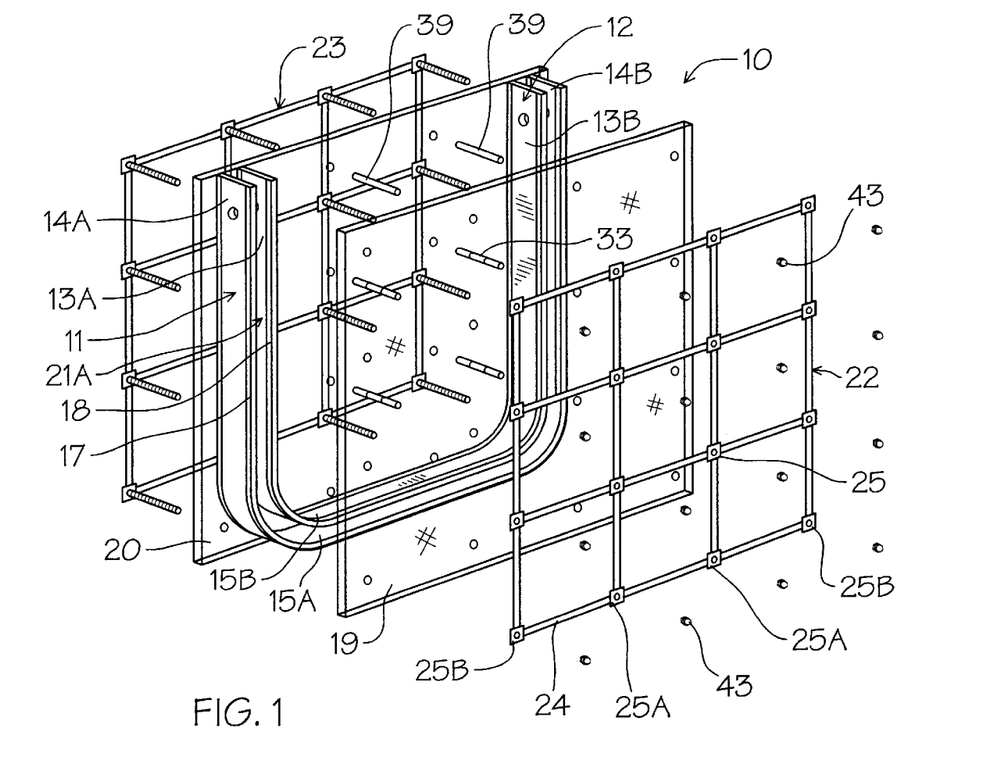
FIG. 1 is an exploded perspective view of the window aquarium of the invention.
Figure 2:
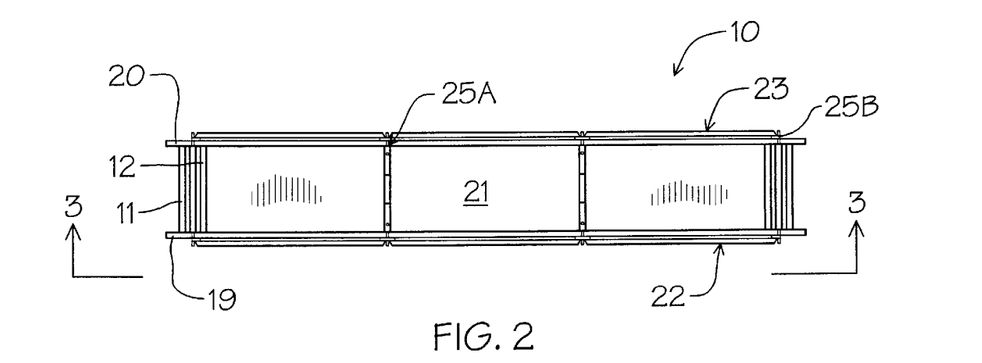
FIG. 2 is a top plan view of the assembled aquarium.
Figure 3:
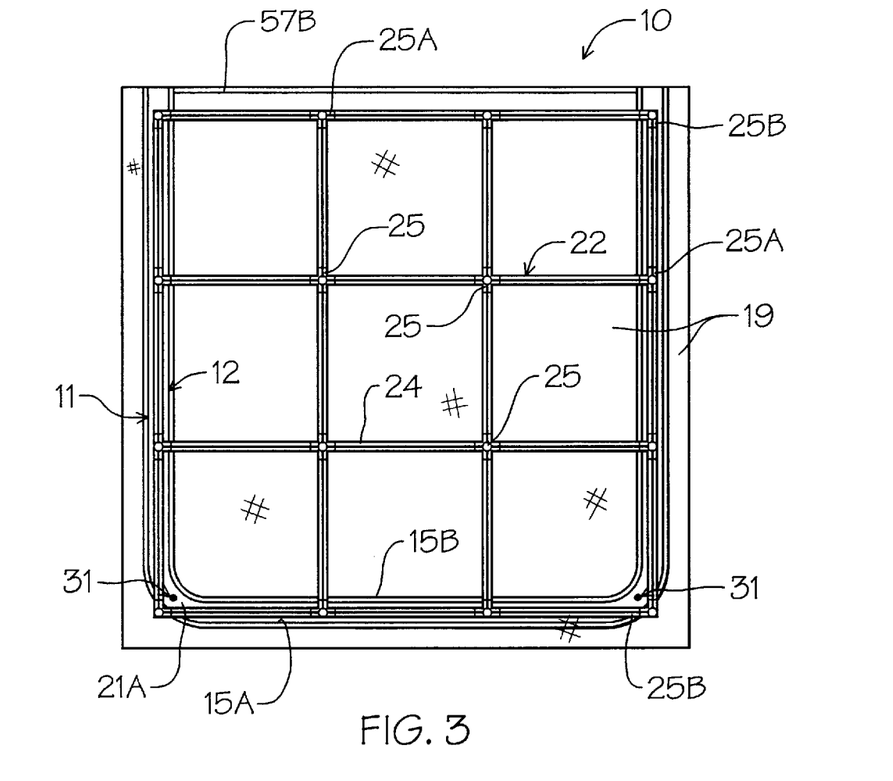
FIG. 3 is front elevational view of the aquarium of the invention.

Referring to FIGS. 1–3 of the drawings, a window aquarium 10 can be seen having a pair of spaced parallel contoured frame members 11 and 12 preferably of metal and are bent at right angle radii to define a U-shaped configuration and are held in spaced parallel relation to one another. The frame members 11 and 12 form respective sidewalls 13A and 13B and 14A and 14B and integral bottoms 15A and 15B.

Figure 18:
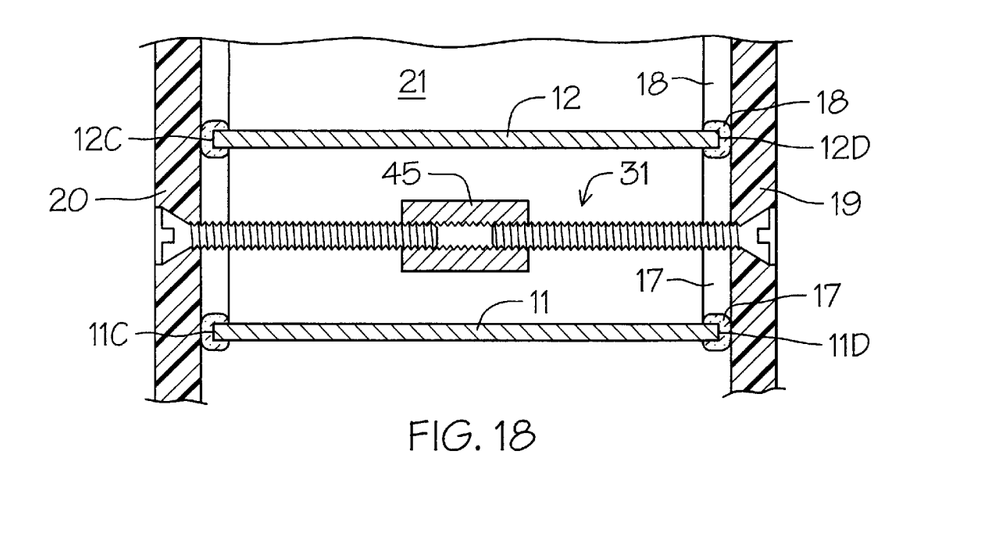
FIG. 18 is an enlarged partial cross-sectional view of the support frame and the perimeter connector assembly within.

Pairs of edge sealing gaskets 17 and 18 extend longitudinally on the respective frame edges 11C and 11D and 12C and 12D, best seen in FIG. 18 of the drawings. An example of such gaskets 17 and 18 are cross-sectionally U-shaped of resilient material and are manufactured by Trim-Lok, Inc. of Buena Park, Calif.

Transparent synthetic resin panels 19 and 20 extend over and beyond the frame members 11 and 12 against the respective sealing gaskets 17 and 18 to form a water retention chamber 21 within an area defined by the walls 13A and 13B and internal bottom wall 15B.

Figure 4:
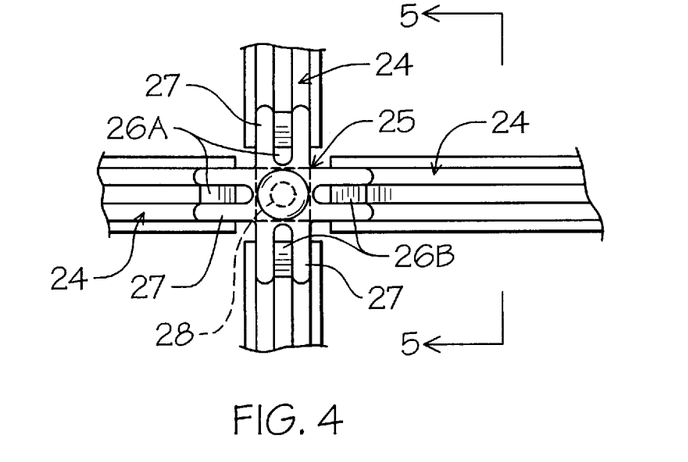
FIG. 4 is an enlarged front elevational view of a grid connector clip and supporting bars with portions broken away.
Figure 5:
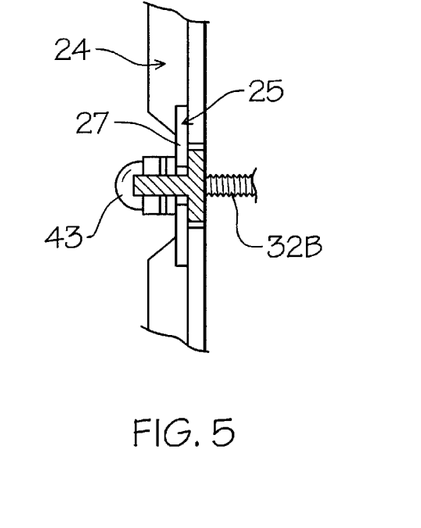
FIG. 5 is a side elevational view on lines 5—5 of FIG. 4.

A pair of support and compression muntin grid assemblies 22 and 23 are made up of a plurality of interconnected muntin bars 24 secured to and between a number of cross-retaining clips 25 as seen in FIGS. 3, 4, and 5 of the drawings. In this example chosen for illustration the muntin bars 24 are of a cross-sectionally T-shaped with oppositely disposed tapered edges 26A and 26B. The cross-retaining clips 25 are of a flat configuration having pairs of oppositely disposed spaced parallel fingers 27 arranged in right angular configurations with a central aperture at 28 in the clip there between.

Figure 12:
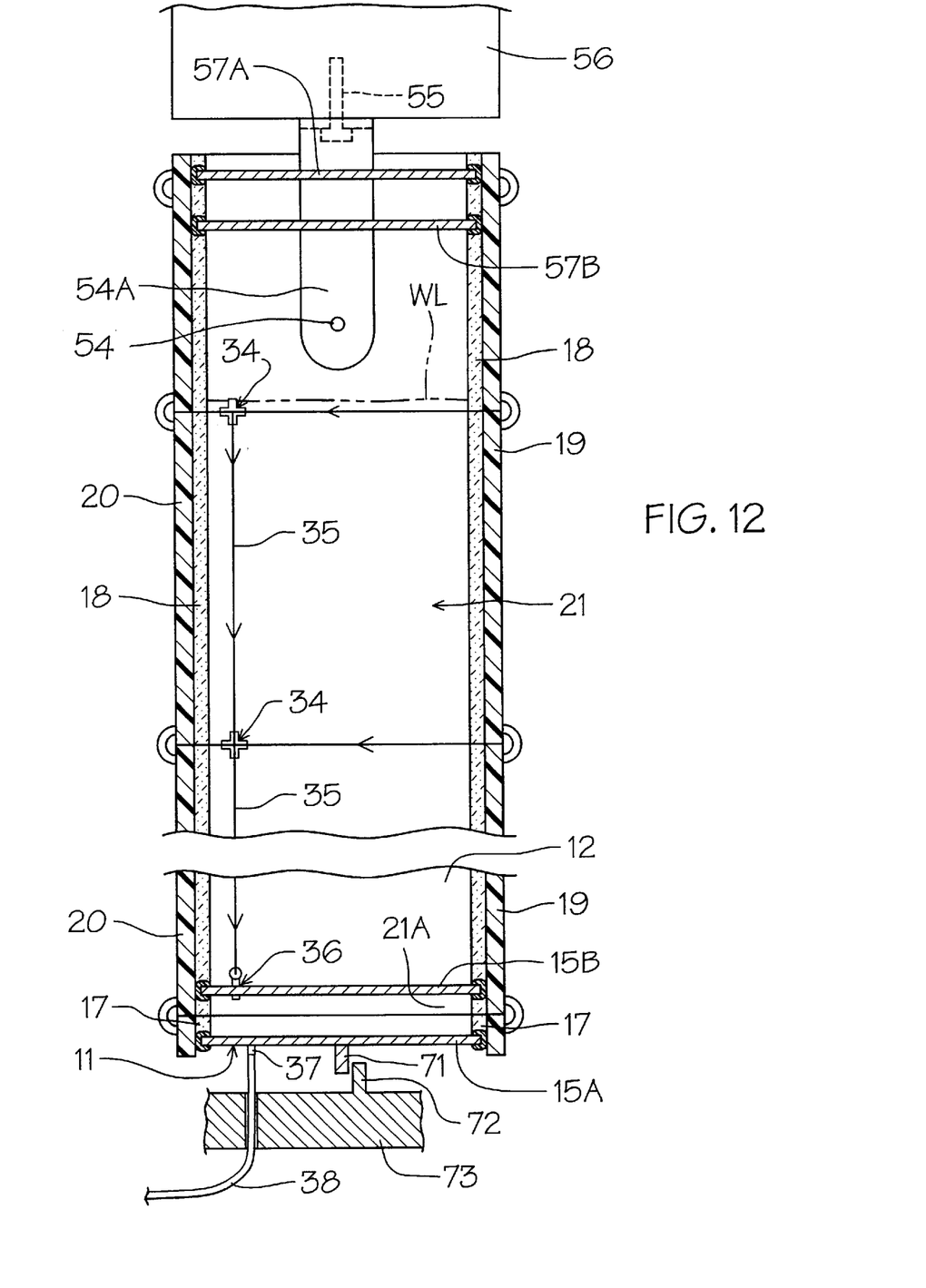
FIG. 12 is a cross-sectional view of the window aquarium with the drain flow path graphically illustrated thereon.
Figure 13:
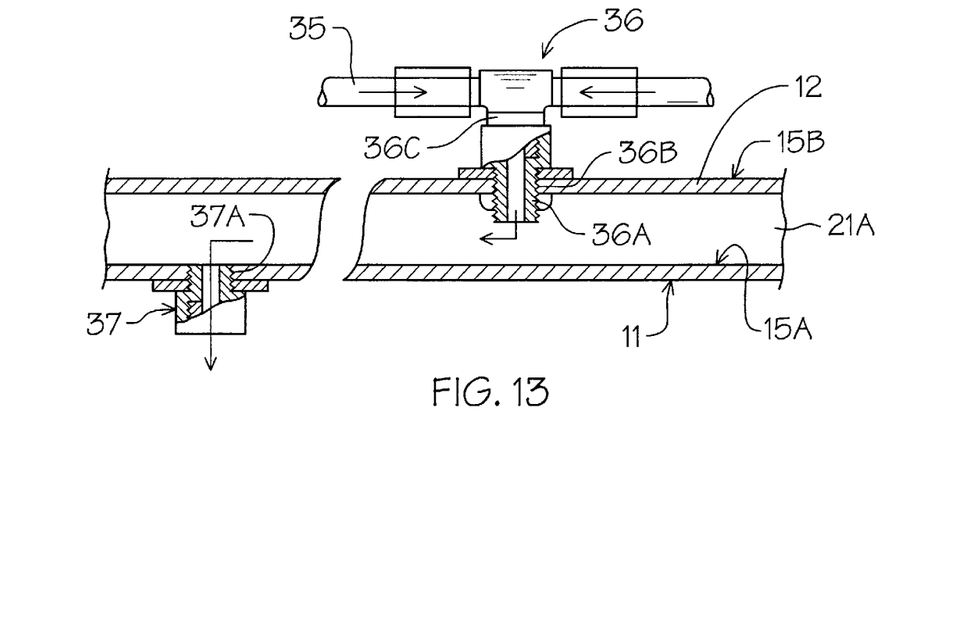
FIG. 13 is an enlarged partial cross-sectional view of the grid assembly drain line fittings within the support frame.
Figure 14:
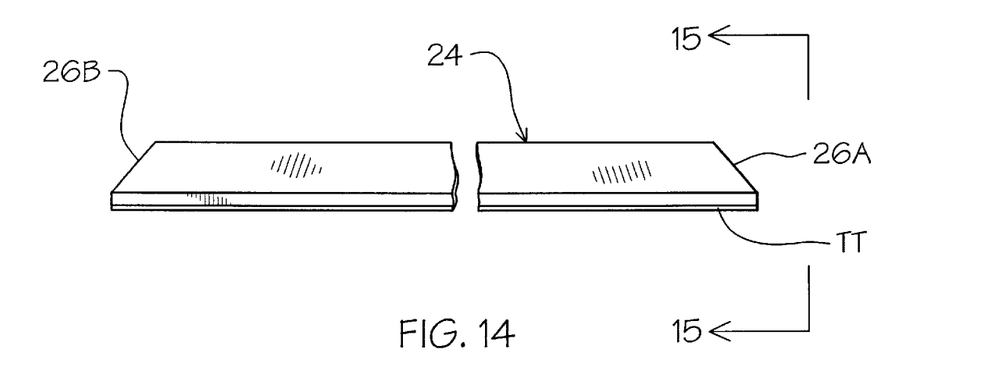
FIG. 14 is an enlarged side elevational view with portions broken away of a support muntin grid bar.
Figure 15:
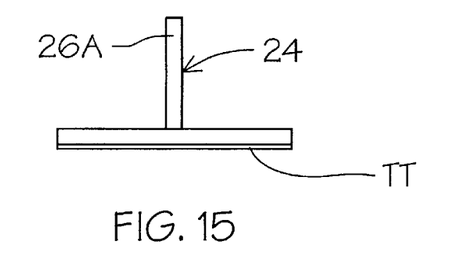
FIG. 15 is an end plan view on lines 15—15 of FIG. 14 of the drawings.

Referring now to FIGS. 3, 4 and 5 of the drawings specifically, it will be seen that clips 25, 25A and 25B engage the independent muntin bars 24 at different junctions overlying the respective ends with their respective tapered upstanding end edges 26A and 26B extending between the paired fingers 27 of clips 25. As assembled, the mullion grids 22 and 23 having Teflon tape TT on their engagement surfaces engage the outer surface of the respective panels 19 and 20 being secured thereto and each other by a plurality of multiple grid connector assemblies 28A–31 that extend through the respective clips as illustrated in FIGS. 1, 2, 3 and 8–11 of the drawings. The respective connector assemblies 28A–31 are designed to meet a variety of installation environments within the window aquarium 10 for retaining the panels 19 and 20 as hereinbefore described. Referring now to FIGS. 8–11 of the drawings, the connector assembly 28A can be seen in FIG. 8 having a threaded bolt 32 with gasketed abutting sleeves 33 thereon and a drainage fitting 34. The sleeves 33 isolate the bolt 32 from water W held within the chamber 21 at this position. The drainage fittings 34 have an inlet at 34A and an outlet at 34B for any seepage that may occur within the respective connector assemblies. The drainage fittings 34 are interconnected by conduits 35 to a main drainage outlet assembly 36 in the bottom 15B of the frame member 11, best seen in FIGS. 12 and 13 of the drawings. The main drain outlet assembly 36 has a gasketed threaded fitting 36A extending through an aperture 36B in the bottom 15A with an inlet T-fitting 36C which is in communication with the conduit 35. This arrangement will drain seepage into the area between the respective frame bottom members 15A and 15B which defines a secondary water containment chamber 21A between the frame members 11 and 12. A frame drainage outlet fitting 37 extends through an aperture 37A in the frame bottom member 15A which in turn has a drain conduit 38 extending there from through the wall W to the outside when used on an exterior wall, as noted. The uppermost fittings 34 will also act as an over flow device never allowing the water level WL to rise there above.

Figure 10:
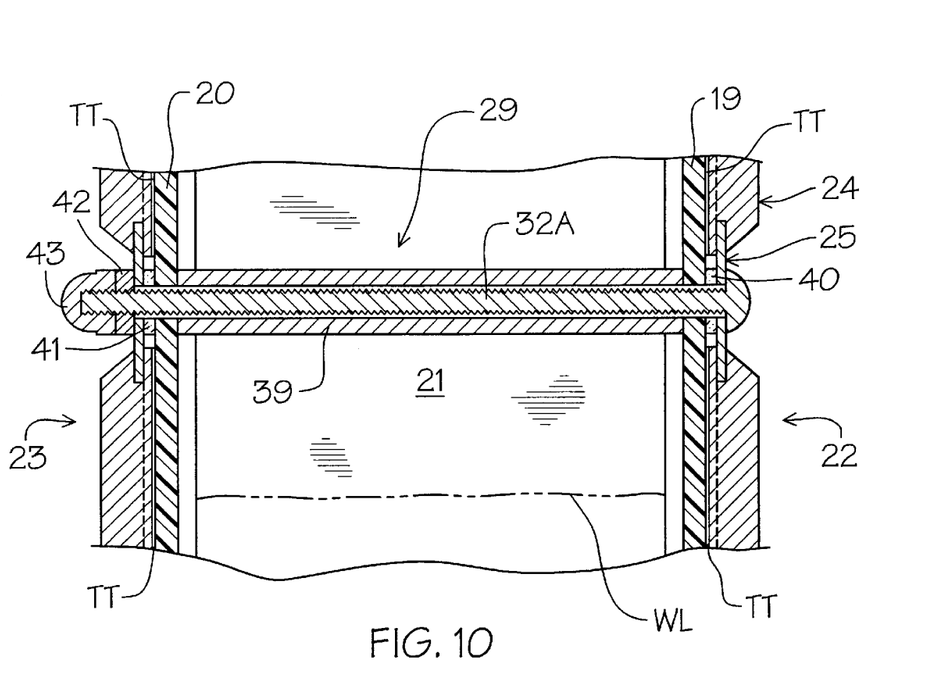
FIG. 10 is an enlarged partial cross-sectional view of a grid connector fastener assembly within the tank positioned above the water line.

The connector assemblies 29, as seen in FIG. 10, are designed to be used within the chamber 21 above a water level WL which does not require sealing isolation from the water. Each of the respective connectors 29 have a bolt 32A within a single sleeve spacer 39 thereon between the respective panels 19 and 20.

Figure 9:
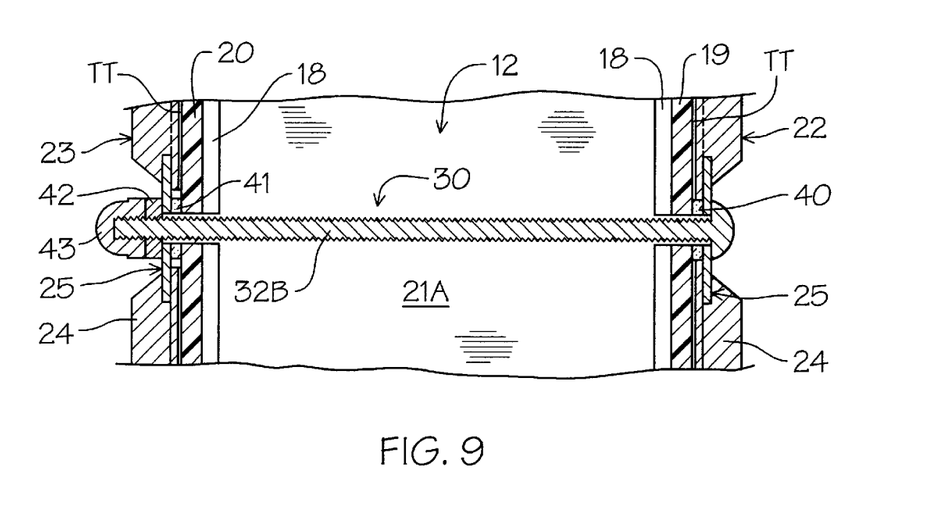
FIG. 9 is an enlarged partial cross-sectional view of a non-submergible grid connector fastener assembly within the support frame with portions broken away.

Referring to FIG. 9 of the drawings, the fastener assemblies 30 can be seen to be used in the water containment chamber 21A between the frame members 11 and 12 as best seen in FIGS. 2 and 9 of the drawings having a bolt 32B. Each of the respective connector assemblies 28A–30 are assembled with the muntin grids 22 and 23 in the following common sequence. The bolts 32, 32A and 32B extend through the respective clips 25 which are in turn engages over the respective ends of the muntin bars 24 as hereinbefore described. A first compression sealing gasket 40 provides a seal between the clip 25 and the respective bolts 32, 32A and 32B (bolts) and the apertured panel 19 through which it extends. The (bolts) extends through the chamber 21 and through an aligned aperture in the remaining panel 20 with a second sealing gasket 41 positioned thereon. The clip 25 and muntin bars 24 are secured to the free end of the (bolts) by a pair of nuts 42 that secure the oppositely disposed muntin grids 22 and 23 together compressing against the respective panels 19 and 20 and sealing same to the hereinbefore-described edge gasket members 17 and 18. A decorative end cap nut 43 is threadably disposed on the exposed end of the (bolts) over the nuts 42 completing the respective connector assemblies 28A–30 as described above.

Figure 11:
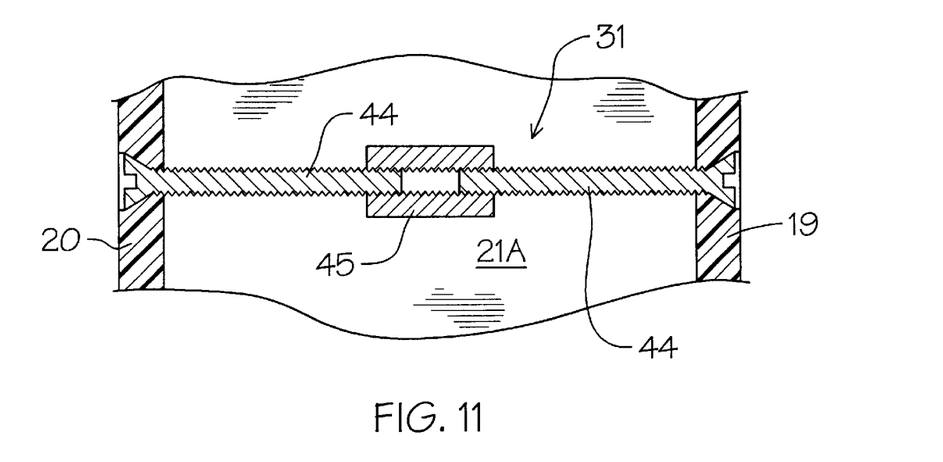
FIG. 11 is an enlarged partial cross-sectional view of the support frame and a perimeter connector assembly.

The connector assembly 31 can be seen in FIG. 11 of the drawings which is to be used anywhere within the drainage chamber 21A as needed. The connector assembly 31 is comprised of a pair of oppositely disposed threaded bolts 44 adjustably engaged into a threaded end rod coupler 45. The bolts 44 are counter sunk just below the surfaces of respective panels 19 and 20 as illustrated to provide additional connection points and greater compression between the respective frame members 11 and 12. Additional connector assemblies 31 can be used for increased sealing pressure as the depth of the water increases, as illustrated in FIG. 16 of the drawings.

Figure 6:
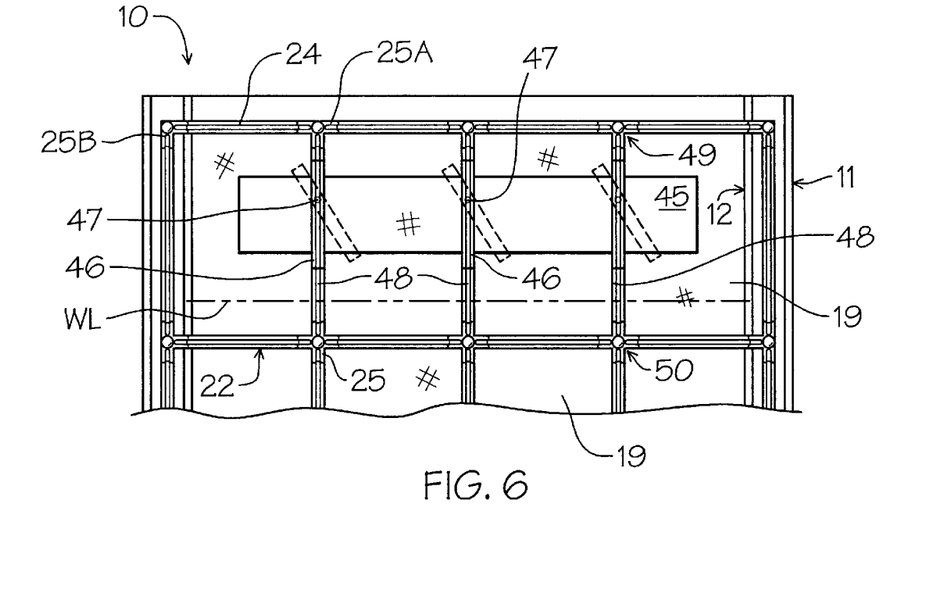
FIG. 6 is a partial front elevational view of an access panel in the window aquarium.
Figure 7:
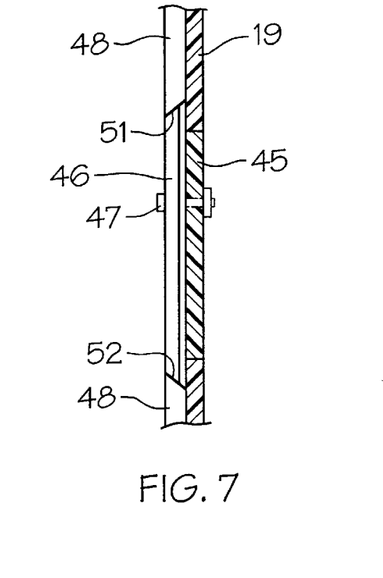
FIG. 7 is an enlarged partial cross-sectional view of a grid release latch on the access panel.
Figure 8:
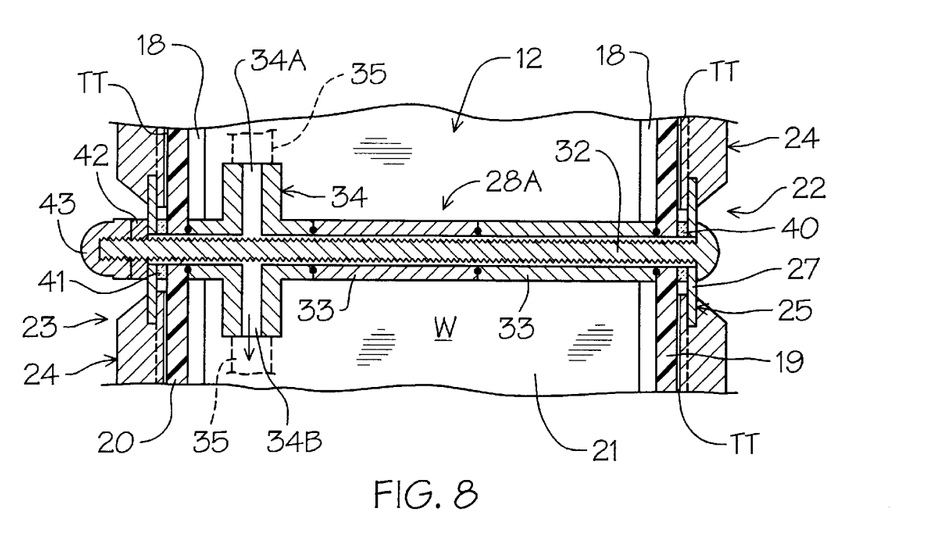
FIG. 8 is an enlarged partial cross-sectional view of a submergible grid connector assembly with associated drain fitting.

Referring now to FIGS. 6 and 7 of the drawings, an access door 45 can be seen formed from a portion of the hereinbefore-described interior panel 19. The door 45 is of a generally rectangular shape and is positioned above the water line WL. Portions of the muntin bars 24 at 46 extend across the door 45 and are pivotally secured thereto by pivot bolts 47, best seen in FIG. 7 of the drawings. The pivoting bar portions 46 align with and are engaged at the respective ends under remaining corresponding bar portions 48 extending from oppositely disposed clip fastener junctions 49 and 50. The pivoting bar portions 46 have angularly disposed ends at 51 and 52 that register with corresponding angular bar ends on the remaining bar portions 48 thus holding the door 45 in position in the vertical plane of the panel in which it is placed.

To remove the access door 45 the respective pivoted bar portions 46 are rotated as indicated in broken lines in FIG. 6 of the drawings from a vertical position to an angular offset position which will free the door 45, allowing it to be removed for access to the window aquarium 10.

Figure 16:
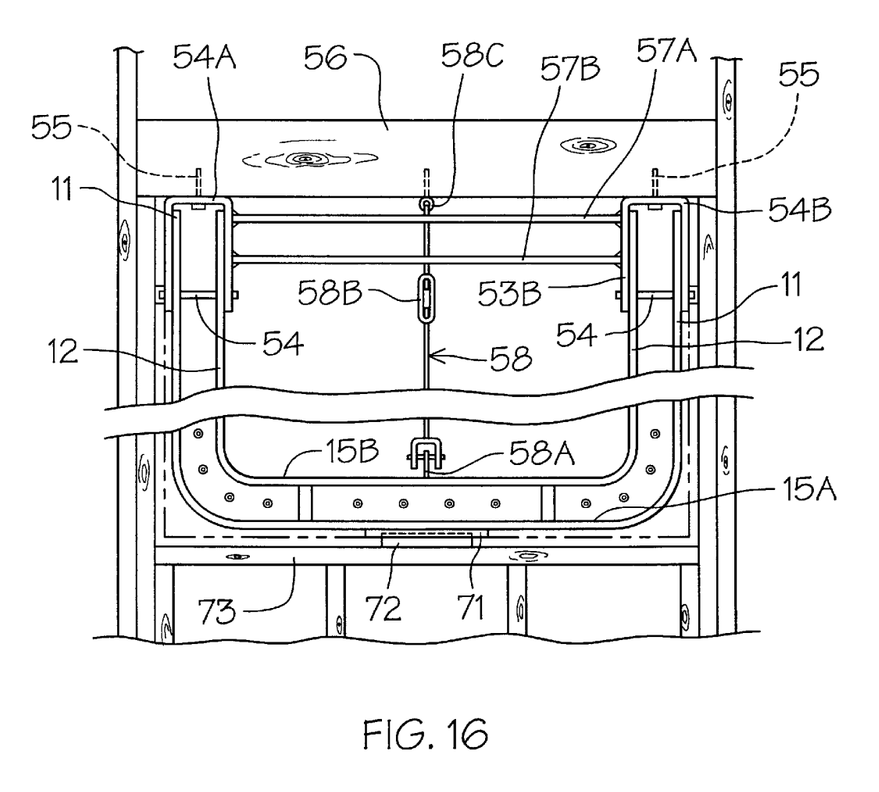
FIG. 16 is a side elevational graphic representation of the aquarium suspension mounting assembly with portions broken away.
Figure 17:
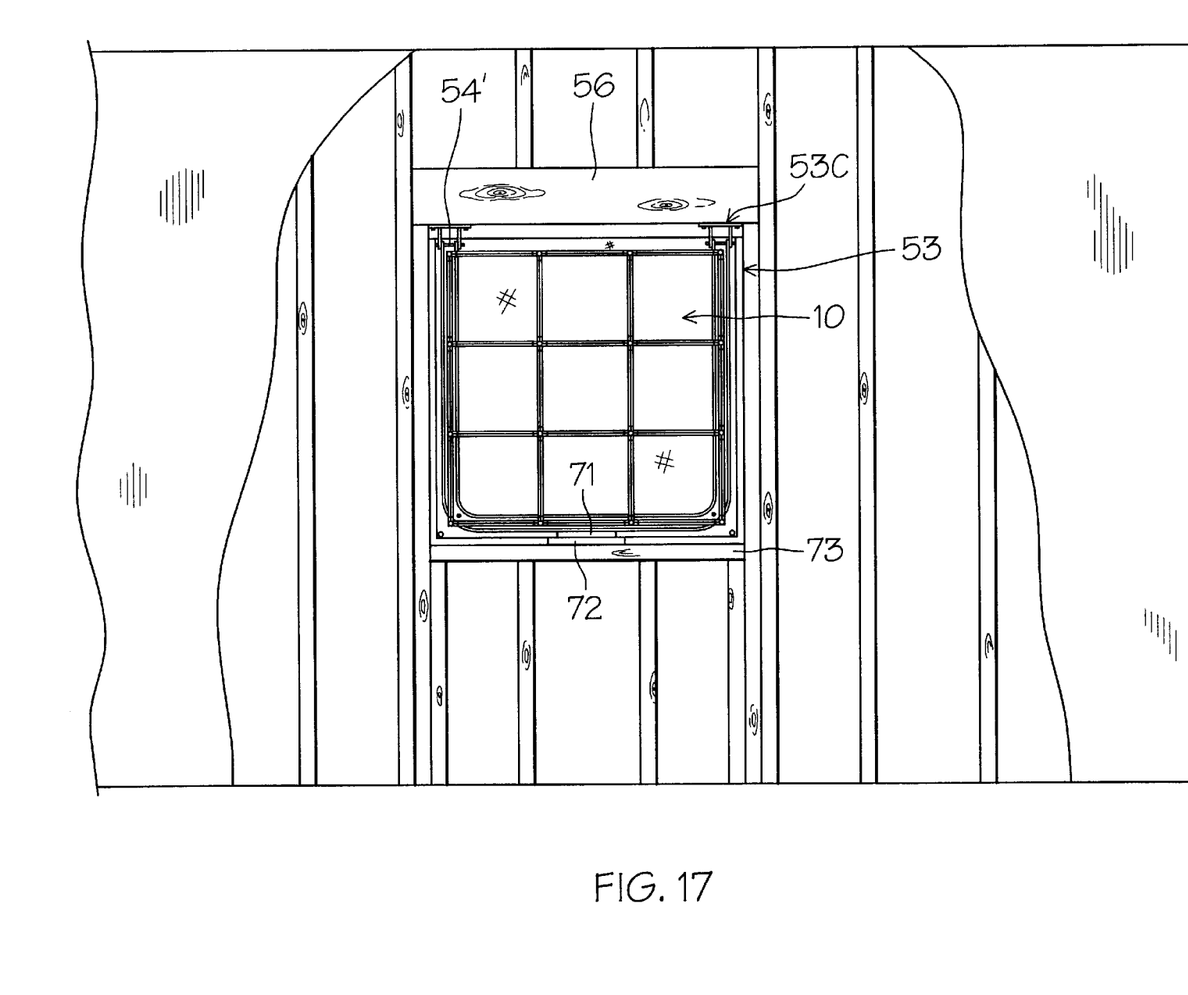
FIG. 17 is a graphic illustration of a typical mounting wall of the aquarium assembly

Referring now to FIGS. 16 and 17 of the drawings, the window aquarium 10 can be seen mounted within a window opening 53 in a wall W. In FIG. 16, a primary pair of U-shaped brackets 54A and 54B have a support pin 54 extending there between. The support pin 54 extends through openings in the respective inner frame members 11 and 12 adjacent their respective free ends. Each of the brackets 54A and 54B have a mounting screw 55 that extends there through into a window header 56 that extends across the top of the window opening 53 in the wall W. In essence, the window aquarium 10 is supported by its frame members 11 and 12 within the opening 53. A pair of secondary frame members 57A, and 57B extend between the hereinbefore described primary aquarium frame member 11 with a secondary mid-span support cable assembly 58 which extends from an apertured lug 58A on the bottom member 15B to an adjustment turnbuckle 58B and then through the representative secondary frame members 57A and 57B to a hanging bolt 58C into the window header 56. A wind deflection stop 71 extends from the bottom 15A of the frame member 11 for registry with an upstanding sill stop 72 extending from a sill 73. This will prevent movement by wind pressure there against. FIG. 17 illustrates a complete wall mounting and discloses an alternate aquarium support brackets 53C that engage both frame members 11 and 12 with a pin 54'. Traditional window framing and trim techniques are used to properly enclose the window aquarium 10 of the invention within the conventional wall W as will be well known by those skilled in the art.

It will be evident from the above description that the window aquarium 10 of the invention can be positioned within an exterior or interior wall of a structure.

Figure 19:
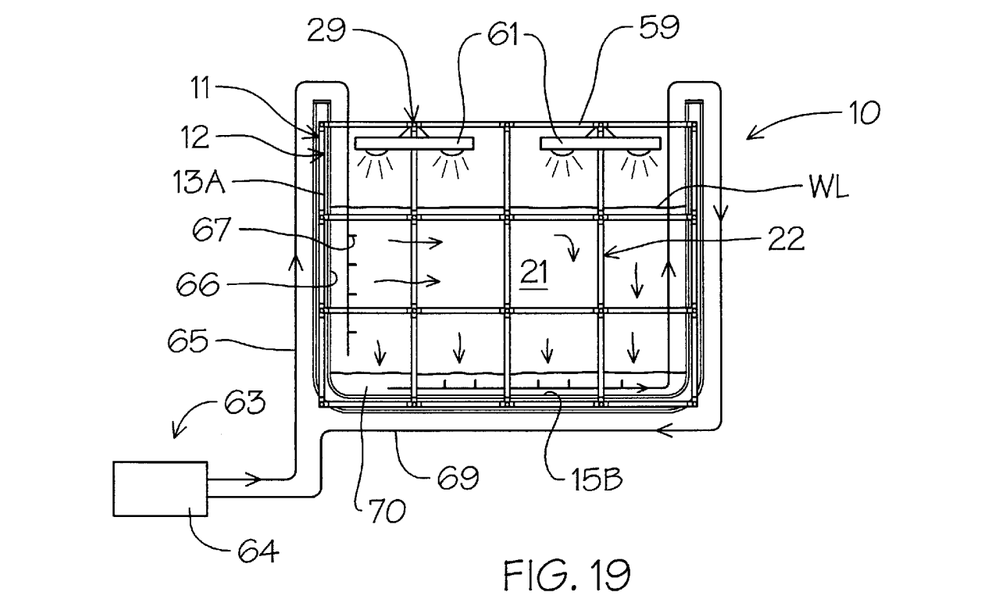
FIG. 19 is a front graphic representation of the wall-mounted aquarium of the invention with associated aquatic life support assemblies.

Referring now to FIG. 19 of the drawings, an alternate top cap plate 59 can be seen (graphically) extending over the top of the respective frame elements 11 and 12 having access openings therein for the support cable 58 and aquarium accessories as will be well understood by those skilled in the art.

As required, artificial light sources 61 can be selectively mounted from the connector assemblies to provide illumination for the aquatic life (not shown) and viewing thereof. Life support equipment for the aquatic life within the aquarium 10 is generally indicated at 63 and will include a water recirculation pump 64 having a pressure water supply line 65 extending into the chamber 21 along the inner surface 66 of the frame element 13A. A plurality of longitudinally spaced outlet nozzles 67 create a water circulation path within the chamber 21 indicated by flow arrows 68. A return water line 69 is positioned on the bottom surface 15B with a layer of sand and gravel 70 extending there over. As is well known within the art, sand and gravel layers act as a filter medium through which water is circulated returning to the water recirculation pump 64.

It will be evident that the other common and well known aquatic life support equipment will be used as would be found in any aquatic life supporting environment depending on the needs of the selective environment.

It will thus be seen that a new and useful window aquarium has been illustrated and described and it will be apparent to those skilled in the art that various changes and modifications may be made without departing from the spirit of the invention.

Therefore I claim:

1. A window aquarium including,
   a water chamber having a dual integrated support frame with overlying front and back walls,
   support grids engageable on said respective front and back walls,
   at least one of said walls being transparent,
   means for interconnecting said respective support grids,
   said support frame having contoured frame elements in spaced parallel relation to one another defining sidewalls and a bottom of said water chamber,
   gasket means on said support frame for sealing said wall elements with said frame and connectors,
   means for collecting and draining water from a secondary water retention chamber between said respective spaced contoured frame elements,
   means for suspending said aquarium within a wall opening, and aquatic life support means interconnected to said water chamber.

2. The window aquarium set forth in claim 1 wherein said support grids comprise a plurality of muntin bars interconnected to one another by interengaging clips.

3. The window aquarium set forth in claim 2 wherein said clips have pairs of oppositely disposed spaced parallel fingers extending from a center aperture therein.

4. The window aquarium set forth in claim 3 wherein each of said muntin bars have a central upstanding portion tapered at its respective ends registerable between said respective finger portions.

5. The window aquarium set forth in claim 1 wherein said means for interconnecting said respective support grids comprises, a plurality of grid connector assemblies, gasket means on said grid connectors.

6. The window aquarium set forth in claim 5 wherein one of said grid connectors comprises,
   a bolt, spacer sleeves on said bolt, threaded retaining nuts, and gasket means between said sleeves.

7. The window aquarium set forth in claim 5 wherein one of said grid connectors comprises,
   a pair of threaded bolts,
   a threaded rod coupler registerable on respective free ends of said bolts.

8. The window aquarium set forth in claim 1 wherein said means for collecting and draining water from said secondary water retention chamber, comprises,
   a drainage fitting registerable on said bolt,
   said drainage fitting having inlet and outlet openings,
   a main outlet fitting in one of said frame member in communication with said drainage fittings, and a secondary water containment chamber, a secondary outlet fitting in said remaining frame member in communication to atmosphere.

9. The window aquarium set forth in claim 1 wherein said means for suspending said aquarium within a wall comprises,
   a pair of brackets registerably engaged said respective contoured frame elements,
   said brackets secured to said wall above an opening in said wall into which said wall mounted aquarium is to be positioned thereby.

10. The window aquarium set forth in claim 1 wherein said wall mounted aquarium further comprises,
    an access door within one of said front and back walls,
    said access door having a plurality of movable grid bars pivotally secured thereto,
    said grid bars having a first interlocked position and a second angularly disposed unlocked position,
    means for grid bar locking registration with said respective adjacent grid members.

11. The window aquarium set forth in claim 10 wherein said access door is of a generally rectangular configuration.

12. The window aquarium set forth in claim 10 wherein said means for grid bar locking registration comprises,
    contoured bar end portions registerable under corresponding contoured ends of adjacent bars of said respective grids.

13. The window aquarium set forth in claim 10 wherein said access door is transparent.

14. The window aquarium set forth in claim 1 wherein said contoured frame elements are preferably made of metal.

15. The window aquarium set forth in claim 5 wherein one of said connector assemblies comprises,
    a bolt,
    a spacer sleeve on said bolt within said first water chamber and threaded retaining nuts registerable on said bolt.

16. The window aquarium set forth in claim 1 wherein said aquatic life support means includes,
    a fluid recirculation pump,
    inlet and outlet lines in communication with said pump,
    said inlet line having a plurality of outlet openings within said water chamber.

17. The window aquarium set forth in claim 1 wherein said gasket means comprises,
    resilient synthetic resin elements about said frame elements and on the respective ends of said connector assemblies abutting said respective front and back walls.

* * * * *